Oct. 26, 1926.
V. M. SPRANGEL
FISHHOOK
Filed June 29, 1926
1,604,725
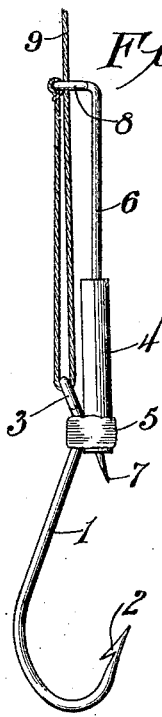
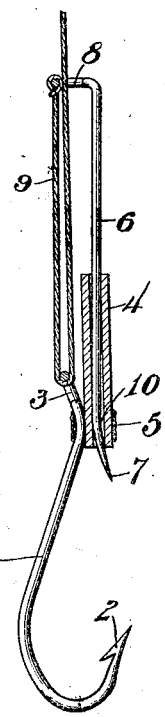
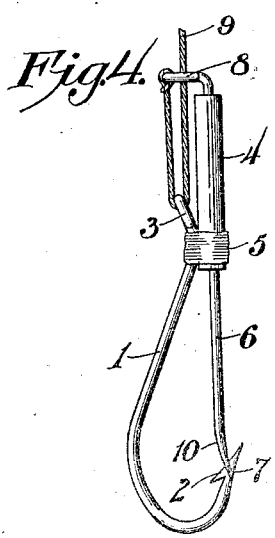
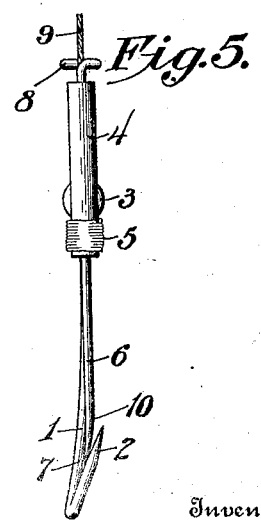
Witnesses
C. L. McDonald
E. N. Lovewell
Inventor
V. M. Sprangel
By E. G. Siggers
Attorney Patented Oct. 26, 1926.

1,604,725

UNITED STATES PATENT OFFICE.

VOLNEY M. SPRANGEL, OF WAGONER, OKLAHOMA.

FISHHOOK.

Application filed June 29, 1926. Serial No. 119,348.

This invention relates to an improved fish hook in which a special auxiliary device, in the nature of a spear, is provided to cooperate with the barbed point of the hook to prevent the escape of the fish therefrom.

The object of the invention is to provide a device of this kind, which is simple and inexpensive in construction, having no spring or trigger to get out of order, and especially one in which the spear may be instantly set at any desired tension, so as to be projected by a predetermined pull on the line, but will not offer the slightest impediment to the removal of the fish from the hook after it has been landed.

The structure and operation of the invention will be more particularly explained in connection wtih the accompanying drawing, in which—

Figure 1 is a side elevation of the invention in open position.

Figure 2 is a front elevation thereof.

Figure 3 is a longitudinal section of the same.

Figure 4 is a side elevation with the hook in closed position.

Figure 5 is a front elevation of the same.

The invention is applied to a fish hook 1, which may be of any size, and provided with the usual barbed point 2 and eye 3. A tube or sleeve 4 has its lower end secured to the shank of the hook 1 adjacent the eye 3, in any suitable manner. In the present instance, I have shown the sleeve 4 secured by means of a fine wire 5, which is wrapped around the sleeve and the shank 1 and soldered.

A spear 6 is slidably mounted in the sleeve 4, and is provided at its lower end with a point 7, which cooperates with the barbed point 2 of the hook. The upper end of the spear 6 is formed with a laterally turned eye 8, to which the end of the line 9 is secured. The line passes from the eye 8 downwardly and through the eye 3, and thence upwardly through the eye 8 to the pole. The eye 3 is bent rearwardly away from the sleeve 4, so as to provide plenty of room for the line 9 to slide freely therethrough.

The bore through the sleeve 4 is somewhat larger than the diameter of the spear 6, and the pointed end of the latter is bent laterally at 10, so that when the spear is drawn upwardly into open position, as shown best in Figure 3, it frictionally engages the wall of the bore to retain it in that position until it is pulled downwardly. The spear 6 is made of spring steel, and it may be drawn upwardly, so as to set it at any desired tension. When so set, a predetermined pull on the line 9 will exert a downward pull on the eye 8, and the point 7 of the spear will be projected in the direction of the barbed point 2 of the hook.

There is no trigger or spring to be set, or to get out of order. The spear 6 may be set instantly, and is ready to be projected as soon as the fish strikes, and the point of the spear cooperates with the point of the hook to retain the fish until it has been landed. The spear 6 may then be instantly raised, so as not to interfere with the removal of the fish from the hook.

While I have shown and described in detail the preferred form of the invention, it is to be understood that the same may be considerably modified without any material departure from the salient features of the invention as set forth in the claims.

What is claimed is:

1. The combination with a fish hook having a shank with a point at one end and an eye at the other end, of a sleeve secured to the shank near said eye, a spear slidably mounted in the sleeve and having a point directed toward the point of the hook, and an eye at the other end of the spear arranged so that a line secured thereto and passing through the eye of the hook may be pulled to project the point of the spear into cooperative relation to the point of the hook.

2. The combination with a fish hook having a shank with a point at one end and an eye at the other end, of a sleeve secured to the shank near said eye, a spear slidably mounted in the sleeve and having its point directed toward the point of the hook, the shank of said spear being smaller in diameter than the bore in the sleeve and having a bend near the point so as to frictionally engage the bore with increasing tension as the spear is retracted, and an eye at the end of the spear opposite to its point, said eye being arranged so that a line secured thereto and passing through the hook may be pulled to project the point of the spear into cooperative relation to the point of the hook.

3. The combination with a fish hook having a shank with a point at one end, of a spear frictionally held in slidable relation to the hook with an adjustable tension therebetween and with the spear pointing toward the point of the hook, and means for connecting a line to the hook and spear respectively in such a manner that when the line is pulled, in response to a fish bite, the friction is overcome and the point of the spear is advanced into intimate relation to the point of the hook.

In testimony that I claim the foregoing as my own, I have hereto affixed my signature.

VOLNEY M. SPRANGEL.